US011866033B2

United States Patent
Persson (10) Patent No.: US 11,866,033 B2
(45) Date of Patent: Jan. 9, 2024

(54) METHOD FOR ESTIMATING AN EFFECTIVE LENGTH OF A FIRST VEHICLE SEGMENT OF A VEHICLE COMBINATION

(71) Applicant: Volvo Truck Corporation, Gothenburg (SE)

(72) Inventor: Daniel Persson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/828,234

(22) Filed: May 31, 2022

(65) Prior Publication Data
US 2022/0388498 A1    Dec. 8, 2022

(30) Foreign Application Priority Data
Jun. 4, 2021 (EP) ..................................... 21177667

(51) Int. Cl.
*B60W 30/045* (2012.01)
*B60W 40/12* (2012.01)
(Continued)

(52) U.S. Cl.
CPC .......... *B60W 30/045* (2013.01); *B60W 40/12* (2013.01); *G01B 11/043* (2013.01);
(Continued)

(58) Field of Classification Search
CPC ............... B60W 30/045; B60W 40/12; B60W 2300/145; B60W 2420/42;
(Continued)

(56) References Cited

U.S. PATENT DOCUMENTS 6,301,548 B1 * 10/2001 Gerum .................. B60T 8/1708
702/158
9,335,162 B2 * 5/2016 Kyrtsos ............. B60W 50/0097
(Continued)

FOREIGN PATENT DOCUMENTS

| WO | WO-2014070047 A1 * | 5/2014 | .......... B60W 40/105 |
| WO | 2020207572 A1 | 10/2020 | |
| WO | WO-2020207572 A1 * | 10/2020 | ............ B60T 8/1708 |

OTHER PUBLICATIONS

"Motion planning an feedback control techniques" by Oskar Ljungqvist, Ph.D. thesis Linkoping University, May 2020 (Year: 2020).*
(Continued)

*Primary Examiner* — Peter D Nolan
*Assistant Examiner* — Tanya C Sienko
(74) *Attorney, Agent, or Firm* — Withrow & Terranova, PLLC (57) ABSTRACT

A method for estimating an effective length of a first vehicle segment of a vehicle combination, the vehicle combination comprising a towing vehicle which is connected to the first vehicle segment via a first articulation joint and a perception sensor mounted on one of the towing vehicle and the first vehicle segment and arranged to obtain an image of the other one of the towing vehicle and the first vehicle segment; the method comprising identifying that the vehicle combination is provided in a first steady vehicle state, identifying that a turning and driving manoeuvre is initiated, identifying when the vehicle combination reaches a second steady vehicle state, determining a time period required for driving the vehicle combination from the first steady vehicle state to the second steady vehicle state, and estimating the effective length by use of the time period, the specific angular change, and the specific speed.

15 Claims, 4 Drawing Sheets

(51) Int. Cl.
*G01B 11/04* (2006.01)
*G01B 11/26* (2006.01)

(52) U.S. Cl.
CPC ....... *G01B 11/26* (2013.01); *B60W 2300/145* (2013.01); *B60W 2420/42* (2013.01); *B60W 2520/22* (2013.01); *B60W 2530/201* (2020.02); *B60W 2540/18* (2013.01); *B60W 2720/22* (2013.01)

(58) Field of Classification Search
CPC ....... B60W 2520/22; B60W 2530/201; B60W 2540/18; B60W 2720/22; G01B 11/043; G01B 11/26
See application file for complete search history.

(56) References Cited

U.S. PATENT DOCUMENTS

| | | | |
|---|---|---|---|
| 9,335,163 B2* | 5/2016 | Lavoie | B60D 1/245 |
| 9,623,904 B2* | 4/2017 | Lavoie | B60W 40/10 |
| 2015/0291179 A1 | 10/2015 | Tagesson | |
| 2019/0086204 A1* | 3/2019 | Critchley | G01S 13/88 |
| 2020/0269852 A1* | 8/2020 | Miller | G06T 7/70 |
| 2022/0332328 A1* | 10/2022 | Weber | B60W 30/18145 |

OTHER PUBLICATIONS

Extended European Search Report for European Patent Application No. 21177667.9, dated Oct. 20, 2021, 11 pages.

\* cited by examiner

METHOD FOR ESTIMATING AN EFFECTIVE LENGTH OF A FIRST VEHICLE SEGMENT OF A VEHICLE COMBINATION

RELATED APPLICATIONS

The present application claims priority to European Patent Application No. 21177667.9, filed on Jun. 4, 2021, and entitled "METHOD FOR ESTIMATING AN EFFECTIVE LENGTH OF A FIRST VEHICLE SEGMENT OF A VEHICLE COMBINATION," which is incorporated herein by reference in its entirety.

FIELD OF THE DISCLOSURE

The invention relates to a method for estimating an effective length of a first vehicle segment of a vehicle combination. The invention further relates to a method for calibrating an articulation angle sensor of a vehicle combination, to a control unit, to a vehicle and to a computer program.

The invention can be applied in heavy-duty vehicles, such as trucks, buses and construction equipment. Although the invention will be described with respect to a truck, the invention is not restricted to this particular vehicle, but may also be used in other vehicles such as passenger cars.

BACKGROUND

Driver assistance systems are becoming more frequently used in many different types of vehicles. For example, there are driver assistance systems for supporting drivers during reversing. Especially, reversing of vehicle combinations comprising at least one articulation joint may be a challenging task for a driver. Therefore, it has been proposed to provide reverse assistance systems to support the driver during reversing, such as assisting in steering the vehicle combination during reversing. The aforementioned systems may also be configured to completely take over the driving control of the vehicle, i.e. the vehicles may be autonomously driven, at least for limited time periods.

The above systems are often sensitive to input values from different sensors and/or input values regarding certain dimensions of the vehicle. Therefore, it is of utmost importance that the input values are correct and reflect the actual true values. For example, for a vehicle combination comprising at least one of the aforementioned systems it may be important to obtain correct information about an effective length of a connected trailer and/or dolly. It is for example common to switch between different trailers having different lengths, and therefore there is also a need of frequently updating the information about the trailer's effective length in order for the one or more systems to function properly.

As another example, articulation angle measurement also needs to be as precise as possible for the systems to function properly. As such, it is also important to assure that articulation angle measurement sensors are properly calibrated, otherwise it may result in reduced performance of the systems. For example, an uncalibrated articulation angle sensor for a reverse assistance system of a vehicle combination may result in that the vehicle combination is not able to correctly follow a desired travelling path.

In view of the above there is a need to develop technology which is able to efficiently estimate an effective length of a vehicle segment of a vehicle combination, and/or which is able to efficiently calibrate an articulation angle sensor of a vehicle combination.

SUMMARY

Therefore, an object of the invention is to provide an improved method for estimating an effective length of a first vehicle segment of a vehicle combination. A further object of the invention is to provide an improved method for calibrating an articulation angle sensor of a vehicle combination. Yet further objects of the invention are to provide an improved control unit, an improved vehicle and/or a computer program.

According to a first aspect of the invention, the object is achieved by a method. According to a second aspect of the invention, the object is achieved by a method. According to a third aspect, the object is achieved by a control unit. According to a fourth aspect, the object is achieved by a control unit. According to a fifth aspect, the object is achieved by a towing vehicle. According to a sixth aspect, the object is achieved by a computer program.

According to the first aspect of the invention, the object is achieved by a method for estimating an effective length of a first vehicle segment of a vehicle combination. The vehicle combination comprises:
  a towing vehicle which is connected to the first vehicle segment via a first articulation joint; and
  a perception sensor mounted on one of the towing vehicle and the first vehicle segment and arranged to obtain an image of the other one of the towing vehicle and the first vehicle segment.

The method comprises:
  identifying that the vehicle combination is provided in a first steady vehicle state, wherein a steady vehicle state is indicative of a condition where an articulation angle of the first articulation joint has reached a stationary angular state corresponding to a specific steering angle of steerable ground engaging means of the towing vehicle;
  identifying that a turning and driving manoeuvre is initiated, wherein the turning and driving manoeuvre comprises changing the steering angle by a specific angular change and driving the vehicle combination with a specific speed from the first steady vehicle state.

The method further comprises:
  identifying when the vehicle combination reaches a second steady vehicle state by use of images obtained by the perception sensor;
  determining a time period required for driving the vehicle combination from the first steady vehicle state to the second steady vehicle state; and
  estimating the effective length by use of the time period, a value indicative of the specific angular change and a value indicative of the specific speed.

By the provision of a method according to the first aspect of the invention, an effective length of a first vehicle segment can be estimated in a fast and reliable manner More specifically, the present invention is based on a realization that the effective length can be estimated by determining the time it takes for the vehicle combination to drive from the first steady vehicle state to the second steady vehicle state. In particular, it has been realized that this time period correlates with the vehicle segment's effective length. For example, a relatively short vehicle segment will reach the second steady vehicle state in a relatively short time period, whilst a relatively long vehicle segment during similar circumstances will reach the second steady vehicle state in a relatively long time period.

By an "effective vehicle length", also known as effective wheel base length, is herein meant a length of the first vehicle segment between a first and second effective wheel axle thereof, or between a first effective wheel axle and a coupling member of an articulation joint of the first vehicle segment. An "effective wheel axle" is herein meant an imaginary wheel axle which intersects a pivot axis of the first vehicle segment. For example, if a vehicle segment comprises two adjacent wheel axles with four wheels at one end of the vehicle segment, the effective wheel axle will be provided in-between, such as midway between, the two adjacent wheel axles. On the other hand, if there is only one wheel axle at one end of a vehicle segment, the effective wheel axle will correspond to the only one wheel axle.

Optionally, the effective length may further be estimated by use of a kinematic vehicle model for the vehicle combination. For example, the kinematic vehicle model may use further vehicle parameters for the estimation, which parameters may be known or measured. For example, an effective length of the towing vehicle may be known already and used by the kinematic vehicle model for the estimation. Furthermore, a distance between a coupling point of the towing vehicle and the towing vehicle's effective rear wheel axle may also be used by the kinematic vehicle model for the estimation. The aforementioned parameters are likely already known since they are parameters of the towing vehicle. Optionally, the kinematic vehicle model may be a linear bicycle model for the vehicle combination.

Optionally, identifying when the vehicle combination reaches the second steady vehicle state may comprise determining a point in time when the towing vehicle or the first vehicle segment in the obtained images is stationary relative the other one of the towing vehicle and the first vehicle segment. This implies a simplified, fast and reliable identification, since for example the perception sensor may be able to make the identification without being calibrated.

Optionally, the images obtained by the perception sensor may be used for obtaining articulation angle values of the first articulation joint. Accordingly, the perception sensor may be a sensor for measuring one or more articulation angles. This implies for example that no additional sensor is required for the effective length estimation of the first vehicle segment.

As such, fewer sensors may be required. Still optionally, the obtained articulation angle values may be uncalibrated articulation angle values. It has namely been realized that the effective length of the first vehicle segment may be estimated by use of an uncalibrated articulation angle sensor of the vehicle combination. Thereby, the effective length may be estimated even before the perception sensor has been calibrated. For example, the perception sensor may require to be calibrated when a new vehicle segment has been connected to the towing vehicle. Therefore, in such a situation the effective length of the new connected vehicle segment can be reliably estimated by use of the method according to the first aspect even before the perception sensor has been calibrated.

Optionally, identifying when the vehicle combination reaches the second steady vehicle state may comprise determining a point in time when an angle time derivative of the obtained articulation angle values is reduced to a predetermined angle time derivative value. For example, even uncalibrated angle values from the perception sensor may be used for determining the point in time when an angle time derivative of the obtained articulation angle values is reduced to a predetermined angle time derivative value. For example, the predetermined angle time derivative value may be set to a value in the range of $1/10$ to $1/1000$ degrees per second (s), such as $1/100$ degrees/s.

Optionally, the first steady vehicle state may be a state where the towing vehicle and the first vehicle segment are provided in a common straight state. This state may be regarded as a simple state which is easy to identify and/or easy for a driver to reach. A common straight state may be defined as a state when the towing vehicle and all connected vehicle segments are provided along a straight longitudinal line. Still optionally, the first steady vehicle state may be a state where a speed of the vehicle combination is zero. This also implies a state which is easy to identify and/or easy for a driver to reach. Further, providing the vehicle in this first steady vehicle state implies facilitated computation for the estimation, i.e. less processing power may be required.

Optionally, the vehicle combination may comprise at least one additional vehicle segment provided in-between the towing vehicle and the first vehicle segment, wherein the additional vehicle segment is connected to the towing vehicle via an additional articulation joint provided in-between the towing vehicle and the additional vehicle segment, and wherein the first articulation joint is provided in-between the additional vehicle segment and the first vehicle segment, wherein estimating the effective vehicle length is further performed by use of an obtained articulation angle value of the additional articulation joint. For example, the additional vehicle segment may be an additional trailer or a dolly. For example, the perception sensor may already be calibrated for the additional vehicle segment so that calibrated articulation angle values of the additional articulation joint are obtained. By using these calibrated values, the effective length of the first vehicle segment can be estimated. The calibrated values are for example used by the aforementioned kinematic vehicle model. Accordingly, the kinematic vehicle model may also be a kinematic vehicle model for a vehicle combination comprising more than one connected vehicle segment.

According to the second aspect of the invention, the object is achieved by a method for calibrating an articulation angle sensor of a vehicle combination. The vehicle combination comprises:

a towing vehicle which is connected to a first vehicle segment via a first articulation joint, wherein the articulation angle sensor is a perception sensor mounted on one of the towing vehicle and the first vehicle segment and arranged to obtain an image of the other one of the towing vehicle and the first vehicle segment.

The method comprises:

estimating an effective length of the first vehicle segment by a method according to any one of the embodiments of the first aspect of the invention; and calibrating the articulation angle sensor by use of the estimated effective length.

Accordingly, once the effective length of the first vehicle segment has been estimated, this value may be used for the calibration of the perception sensor. For example, if a new vehicle segment is connected to the towing vehicle, the effective length of this vehicle segment may be unknown. Furthermore, the perception sensor may not be calibrated for this new vehicle segment. Thereby, it has been realized that by first performing the method according to the first aspect of the invention and then performing the method according to the second aspect of the invention, the perception sensor can be calibrated in a reliable and fast manner A well-calibrated perception sensor implies a more reliable driver assistance system and/or a more reliable autonomous driving system. As already mentioned in the above, it is very important to obtain correct and reliable articulation angle values in order for such systems to perform well. The calibration may be performed by use of the aforementioned kinematic vehicle model.

It shall be noted that all embodiments of the first aspect of the invention are applicable to and combinable with all embodiments of the second aspect of the invention, and vice versa.

According to the third aspect of the invention, the object is achieved by a control unit for estimating an effective length of a first vehicle segment of a vehicle combination. The vehicle combination comprises:
- a towing vehicle which is connected to the first vehicle segment via a first articulation joint; and
- a perception sensor mounted on one of the towing vehicle and the first vehicle segment and arranged to obtain an image of the other one of the towing vehicle and the first vehicle segment; wherein the control unit is configured to perform the steps of the method according to any one of the embodiments of the first aspect of the invention.

Advantages and effects of the third aspect are largely analogous to advantages and effects of the first aspect of the invention. It shall be noted that all embodiments of the third aspect of the invention are applicable to and combinable with all embodiments of the first and second aspects of the invention, and vice versa.

Optionally, the control unit may further be configured to:
- issue a signal for providing the vehicle combination in the first steady vehicle state; and/or,
- issue a signal for initiating the turning and driving manoeuvre.

The signals may for example be issued to a driver who then manually provides the vehicle combination in the first steady vehicle state and/or manually initiates the turning and driving manoeuvre. Accordingly, the signals may e.g. be configured to provide one or more instructions to the driver via a display and/or via an audio system. Additionally, or alternatively, the signals may be used for automatically providing the vehicle combination in the first steady vehicle state and/or for automatically initiating the turning and driving manoeuvre. Accordingly, the towing vehicle may at least partly be an autonomous vehicle.

According to the fourth aspect of the invention, the object is achieved by a control unit for calibrating an articulation angle sensor for a vehicle combination, wherein the control unit is configured to perform the steps of the method according to any one of the embodiments of the second aspect of the invention.

Advantages and effects of the fourth aspect of the invention are largely analogous to advantages and effects of the second aspect of the invention. It shall also here be noted that all embodiments of the fourth aspect of the invention are applicable to and combinable with all embodiments of the first, second and third aspects of the invention, and vice versa.

According to the fifth aspect of the invention, the object is achieved by a towing vehicle for a vehicle combination, wherein the towing vehicle comprises a control unit according to any one of the embodiments of the third and/or fourth aspects of the invention. The towing vehicle also preferably comprises a perception sensor as disclosed herein, even though the control units also may be configured to obtain image data from a perception sensor which is mounted on a connected vehicle segment.

Advantages and effects of the fifth aspect are largely analogous to advantages and effects of the first, second, third and fourth aspects of the invention. It shall also here be noted that all embodiments of the fifth aspect of the invention are applicable to and combinable with all embodiments of the first, second, third and fourth aspects of the invention, and vice versa.

According to the sixth aspect of the invention, the object is achieved by a computer program comprising program code means for performing the steps of any of the embodiments of the first and/or second aspect of the invention, when said program is run on a control unit.

According to a yet further aspect of the invention, the object is achieved by a computer readable medium comprising instructions which, when executed by a control unit, causes the control unit to perform the steps of any of the embodiments of the first and/or second aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 1:
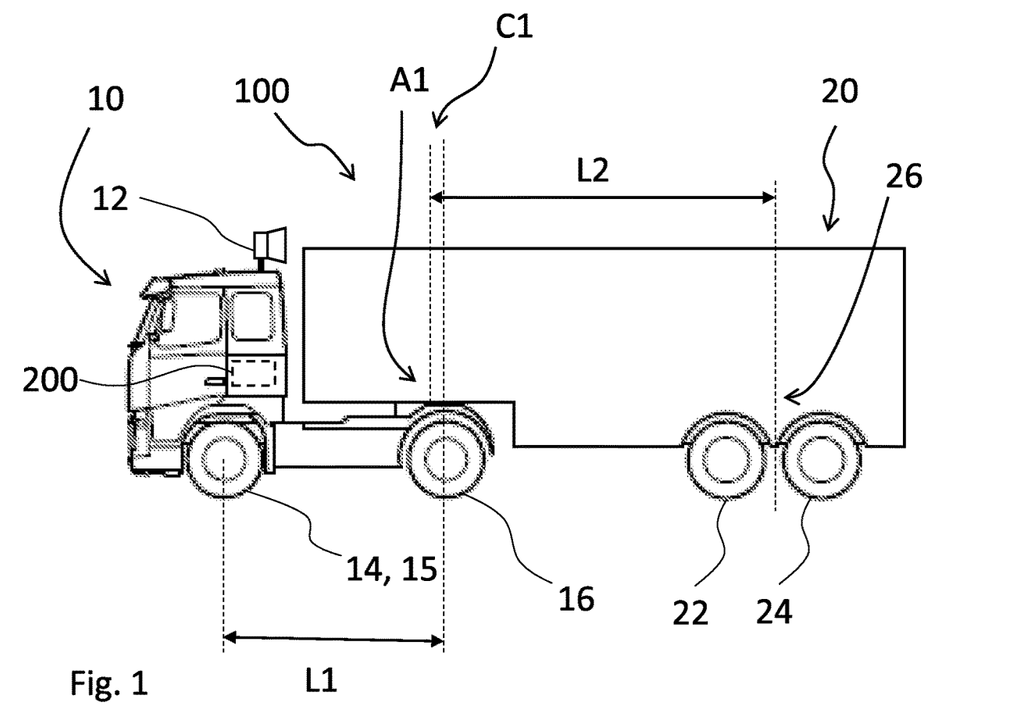
FIG. 1 is a side view of a vehicle combination comprising a towing vehicle and a trailer according to an example embodiment of the invention.

FIG. 1 shows a side view of a vehicle combination 100 comprising a towing vehicle 10 and a trailer 20. The trailer is here also denoted a first vehicle segment 20. The towing vehicle 10 is connected to the first vehicle segment 20 via a first articulation joint A1. In the shown embodiment, the first articulation joint A1 is a so-called fifth-wheel coupling arrangement, wherein the first vehicle segment 20 comprises a kingpin which is connectable to a fifth wheel of the towing vehicle 10. It shall however be noted that any type of coupling arrangement may be used, including but not limited to a drawbar coupling arrangement.

The vehicle combination 100 further comprises a perception sensor 12 which here is mounted on the towing vehicle 10 and arranged to obtain an image of the first vehicle segment 20. The perception sensor 12 is here a camera, even though any other type of perception sensor may be used, such as a light detection and ranging (LIDAR) sensor, radio detection and ranging (RADAR) sensor, sound navigation and ranging (SONAR) sensor, ultrasonic sensor, or the like.

The vehicle combination 100 is here a truck and semi-trailer combination with one articulation joint, i.e. the first articulation joint A1.

Figure 2A:
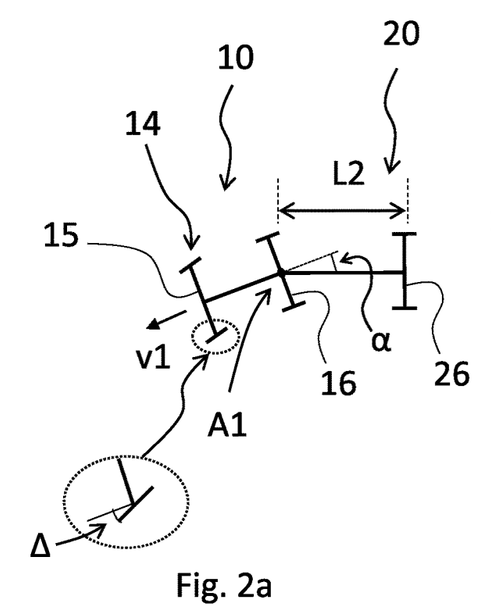
FIGS. 2a-b are schematic views of the vehicle combination shown in FIG. 1.
Figure 2B:
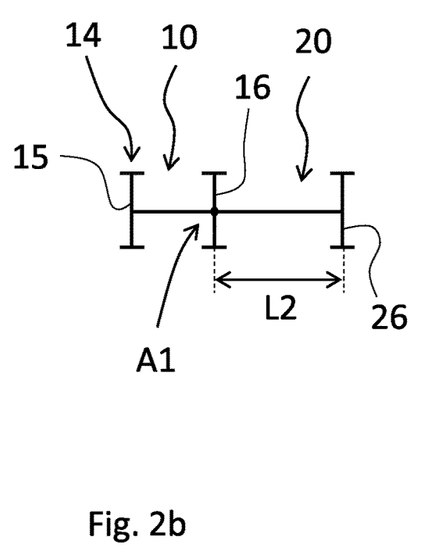

The vehicle combination 100 as shown in FIG. 1 is also shown in schematic and simplified views from above in FIGS. 2a-b.

As shown, the towing vehicle 10 comprises steerable ground engaging means 14, herein in the form of steerable front wheels, which are provided on a front wheel axle 15 of the towing vehicle 10. The towing vehicle 10 further comprises rear wheels provided on a rear wheel axle 16 of the towing vehicle 10. The rear wheel axle 16 is an effective wheel axle of the towing vehicle 10, i.e. the wheel axle 16 intersects and is configured to turn around a pivot axis of the towing vehicle 10 during driving.

The first vehicle segment 20, i.e. the semi-trailer, comprises two wheel axles 22, 24 at the rear end of the first vehicle segment 20. Accordingly, an effective wheel axle 26 of the first vehicle segment 20 will here be provided in the middle between the two wheel axles 22, 24.

The first vehicle segment 20 has an effective length L2, which is a length between the articulation joint A1, i.e. the kingpin, and the effective wheel axle 26 at the rear of the first vehicle segment 20.

With respect to FIGS. 1, 2a-b, and FIG. 4, a method according to the first aspect will be described.

Figure 4:
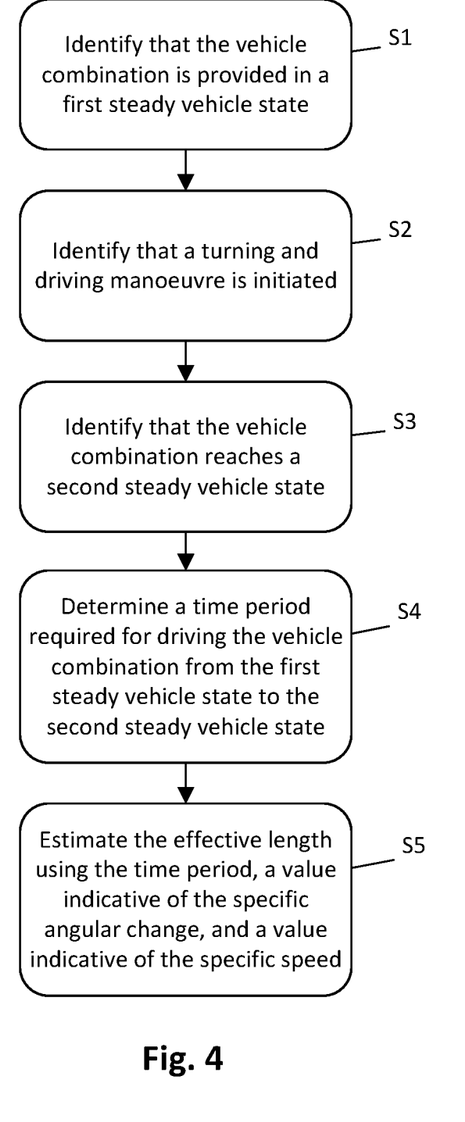
FIG. 4 is a flowchart of a method according to the first aspect of the invention.

The method comprises:

S1: identifying that the vehicle combination 100 is provided in a first steady vehicle state, wherein a steady vehicle state is indicative of a condition where an articulation angle α of the first articulation joint A1 has reached a stationary angular state corresponding to a specific steering angle of the steerable front wheels 14 of the towing vehicle 10.

For example, the first steady vehicle state may be a state as shown in FIG. 2b, where the towing vehicle 10 and the first vehicle segment 20 are provided in a common straight state. Accordingly, in this state the steering angle of the steerable front wheels 14 is zero, indicative of straight forward driving of the vehicle combination 100. It shall however be noted that any other steady vehicle state is also possible as a starting state. Furthermore, the first steady vehicle state may also be a state where a speed of the vehicle combination 100 is zero. For example, a driver may provide the vehicle combination 100 in a straight common state and then stop the vehicle combination 100. Alternatively, this may also be done automatically or semi-automatically, e.g. at least one of steering, gas and braking may be performed automatically to provide the vehicle combination 100 to the first steady vehicle state. The identification in S1 may be performed by e.g. a driver indicating that the vehicle combination 100 is provided in the first steady vehicle state. Additionally, or alternatively, the identification may e.g. be done by use of sensors, such as by use of the perception sensor 12, and in a similar manner as described with respect to identifying the second steady vehicle state, as will be described below.

The method further comprises:

S2: identifying that a turning and driving manoeuvre is initiated, wherein the turning and driving manoeuvre comprises changing the steering angle by a specific angular change Δ, see FIG. 2a, and driving the vehicle combination 100 with a specific speed v1 from the first steady vehicle state.

The method further comprises:

S3: identifying when the vehicle combination 100 reaches a second steady vehicle state by use of images obtained by the perception sensor 12;

S4: determining a time period t1 required for driving the vehicle combination 100 from the first steady vehicle state to the second steady vehicle state; and S5: estimating the effective length L2 by use of the time period t1, a value indicative of the specific angular change Δ and a value indicative of the specific speed v1.

The specific angular change Δ as initiated is preferably maintained until the second steady vehicle state is reached, implying facilitated calculation and reduced processing power. In addition, the specific speed v1 is preferably a constant speed, or substantially constant, even though also the specific speed v1 may vary until the second steady vehicle state is reached.

The value indicative of the specific angular change Δ may be the actual measured value of the steering angle, e.g. expressed in degrees or radians, and/or it may be a value indicative of the towing vehicle's 10 yaw and/or yaw rate. For example, the speed v1 and the specific angular change Δ may define a yaw rate of the towing vehicle 10, and this may be used for the L2 estimation.

The effective length L2 may further be estimated by use of a kinematic vehicle model for the vehicle combination 100.

For example, such a model may be expressed as:

$$\alpha = -(v1*(L2*\sin(\Delta)+C1*\cos(\alpha)*\sin(\Delta)+L1+\cos(\Delta)+\sin(\alpha)))/(L1*L2*\cos(\Delta))$$

where α' is the articulation angle time derivative, L1 is the effective length of the towing vehicle 10 and C1 is the distance between the articulation joint and the effective wheel axle 16. In the embodiment shown in FIG. 1, C1 is substantially zero, i.e. it may be omitted in the calculation.

Identifying when the vehicle combination 100 reaches the second steady vehicle state may comprise determining a point in time when the towing vehicle 10 or the first vehicle segment in the obtained images is stationary relative the other one of the towing vehicle 10 and the first vehicle segment 20. In the model described above, the articulation angle α and its time derivative is used for estimating L2. Accordingly, the perception sensor 12 may be a sensor which is used for obtaining articulation angle values of the first articulation joint A1. However, even if the perception sensor 12 is uncalibrated, the values α can still be used for reliably estimating L2. For example, the uncalibrated perception sensor 12 may still be able to reliably identify when the vehicle combination 100 reaches the second steady vehicle state by e.g. determining a point in time when an angle time derivative of the obtained articulation angle values is reduced to a predetermined angle time derivative value. In other words, even if the obtained articulation angle values are not correctly reflecting the actual articulation angle values, the angle time derivative will be reliable, and also the change of the articulation angle α from the first steady vehicle state to the second steady vehicle state will be reliable. Therefore, the time period t1 required for reaching the second steady vehicle state can be reliably determined, and also the change of the articulation angle α from the first steady vehicle state to the second steady vehicle state can be reliably determined. By use of this information, and by use of the above kinematic vehicle model, the effective length L2 can be estimated.

Accordingly, all values in the above model are known, except for L2.

As an example, L2 may be estimated by letting L2_it, where it=1, . . . , N, steps through N values in [L2_min, L2_max], where L2_min is a minimum possible trailer length, and L2_max is a maximum possible trailer length, set e.g. by EU or US standards.

For each L2_it, the above model is integrated, to get a function α_it(time). For the integration, the first steady vehicle state is used where e.g. a driver placed the vehicle combination 100 in the straight common state. The model is also used to provide a corresponding function α'_it(time) for each L2_it.

Accordingly, this results in a function α_it(time) and a function α'_it(time), for each L2_it, where it=1, . . . , N.

By using the functions α_it(time) and α'_it(time), it can be determined a time_it when the vehicle combination 100 has reached the second steady vehicle state, for each L2_it, with it=1, . . . , N. This results in a scalar value time_it, for each L2_it, where it=1, . . . , N.

Figure 6A:
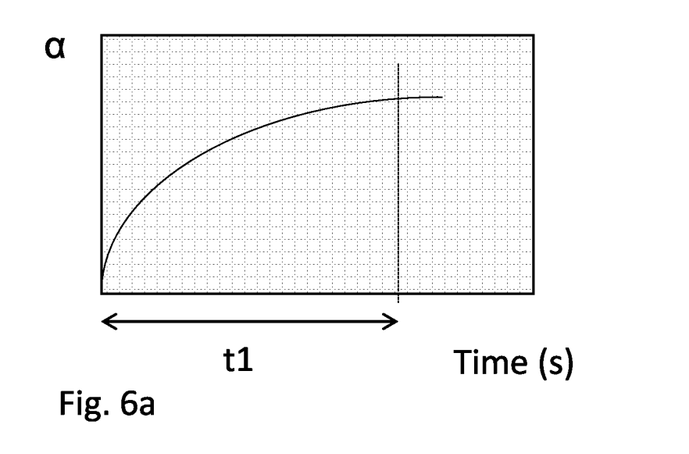
FIGS. 6a-b show diagrams representing articulation angle change over time according to example embodiments of the invention.
Figure 6B:
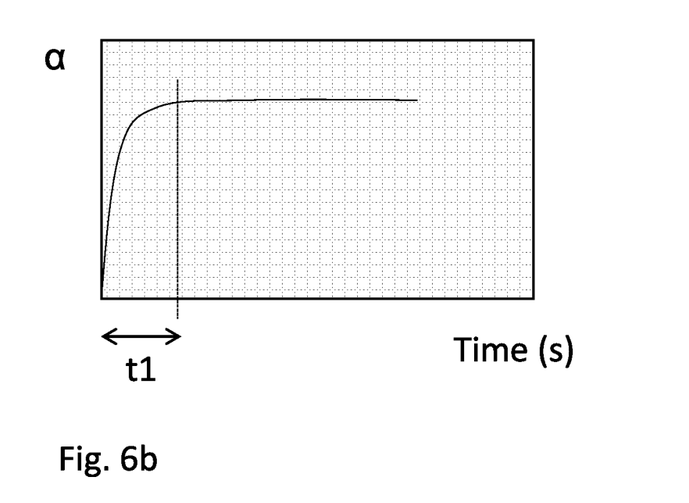

As an example, FIGS. 6a-b show example diagrams where each vertical axis represents the articulation angle α in degrees and each horizontal axis represents time. In these examples, v1=1 meter (m)/s, L1=5 m, C1=0.2 m and Δ=5 degrees. The vehicle combination 100 starts in a straight common state with no speed. In FIG. 6a, the second steady vehicle state was reached in about 73 s (t1=73 s), with an angular change α from 0 degrees to about 15 degrees, where L2 was estimated to 15 m. In FIG. 6b, on the other hand, the second steady vehicle state was reached in about 19 s (t1=19 s), with an angular change α from 0 degrees to about 4 degrees, where L2 was estimated to 4 m. In these examples the second steady vehicle state was considered reached when the articulation angle time derivative dropped to $1/100$ degrees/s, i.e. the predetermined angle time derivative was set to $1/100$ degrees/s.

Figure 3:
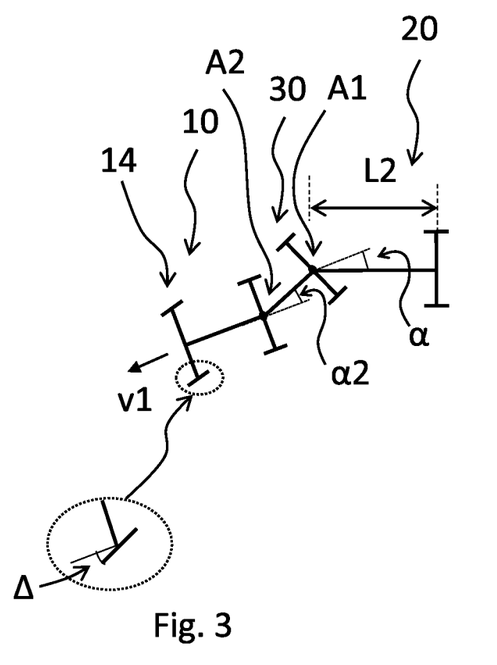
FIG. 3 is a schematic view of a vehicle combination comprising a towing vehicle, a first vehicle segment and an additional connected vehicle segment according to an example embodiment of the invention.

As shown in FIG. 3, the vehicle combination 100 may comprise at least one additional vehicle segment 30. For example, the vehicle combination 100 may be a so-called Nordic combination comprising a dolly, which here is the additional vehicle segment 30.

The additional vehicle segment 30 is provided in-between the towing vehicle 10 and the first vehicle segment 20, wherein the additional vehicle segment 30 is connected to the towing vehicle 10 via an additional articulation joint A2 provided in-between the towing vehicle 10 and the additional vehicle segment 30. The first articulation joint A1 is provided in-between the additional vehicle segment 30 and the first vehicle segment 20. In this case, estimating the effective vehicle length L2 is further performed by use of an obtained articulation angle value α2 of the additional articulation joint A2. The effective length of the dolly may be known or it may be estimated by a method according to the first aspect of the invention, and effective dolly length may also be used for the L2 estimation.

Figure 5:
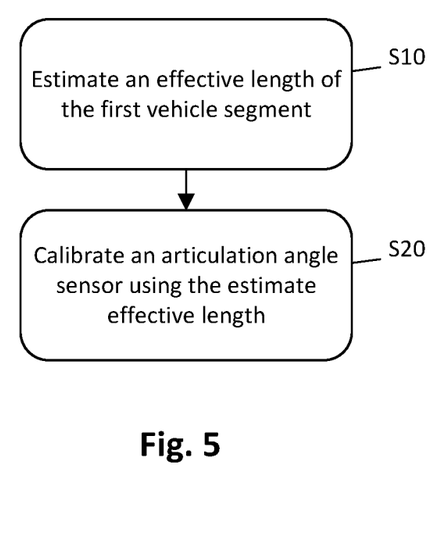
FIG. 5 is a flowchart of a method according to the second aspect of the invention.

With respect to FIG. 5, a method according to the second aspect of the invention is shown. The method is a method for calibrating an articulation angle sensor 12 of a vehicle combination 100. Accordingly, it may be the perception sensor 12 as described in the above.

The method comprises:

S10: estimating an effective length L2 of the first vehicle segment 20 by a method according to any one of the embodiments of the first aspect of the invention; and S20: calibrating the articulation angle sensor 12 by use of the estimated effective length L2.

The articulation angle sensor 12 may be calibrated by using the same kinematic vehicle model as described in the above.

The towing vehicle 10 may comprise a control unit 200 (see FIG. 1). The control unit 200 is preferably an electronic control unit (ECU) of the towing vehicle 10, and may comprise hardware or hardware and software for performing the methods as disclosed herein. The control unit 200 may be one single control unit or it may be a plurality of communicatively connected sub-control units.

The control unit 200 can thus be used for estimating an effective length L2 of the first vehicle segment 20 of the vehicle combination 100. Accordingly, the control unit 200 may be configured to perform the steps of the method according to any one of the embodiments of the first aspect of the invention. The control unit 200 is thus also communicatively connected to the perception sensor 12, and it is also configured to receive and/or store other measured values, such as the aforementioned steering angle change Δ and the vehicle speed v1. The control unit 200 may accordingly utilize a computer program as disclosed herein. The control unit may also be denoted a computer.

The control unit 200 may further be configured to issue a signal for providing the vehicle combination 100 in the first steady vehicle state; and/or issue a signal for initiating the turning and driving manoeuvre. For example, the control unit 200 may additionally be communicatively connected to a display and/or an audio system of the towing vehicle 10, which is/are used for instructing and informing a vehicle driver.

The control unit 200 may also be used for calibrating the articulation angle sensor 12. Accordingly, the control unit 200 may additionally or alternatively be configured to perform the steps of the method according to any one of the embodiments of the second aspect of the invention.

In an alternative embodiment, the control unit is an at least partly remote control unit which is off-board the vehicle combination 100. Accordingly, the towing vehicle 10 may be communicatively connected to a remote control unit (not shown), e.g. by use of wireless communication means.

It is to be understood that the present invention is not limited to the embodiments described above and illustrated in the drawings; rather, the skilled person will recognize that many changes and modifications may be made within the scope of the appended claims.

The invention claimed is:

1. A method for estimating an effective length of a first vehicle segment of a vehicle combination, the vehicle combination comprising:
   a towing vehicle which is connected to the first vehicle segment via a first articulation joint; and
   a perception sensor mounted on one of the towing vehicle and the first vehicle segment and arranged to obtain images of the other one of the towing vehicle and the first vehicle segment;
   the method comprising:
   identifying that the vehicle combination is provided in a first steady vehicle state, wherein a steady vehicle state is indicative of a condition where an articulation angle of the first articulation joint has reached a stationary angular state corresponding to a specific steering angle of steerable ground engaging means of the towing vehicle;

identifying that a turning and driving maneuver is initiated, wherein the turning and driving maneuver comprises changing the steering angle by a specific angular change and driving the vehicle combination with a specific speed from the first steady vehicle state;

identifying when the vehicle combination reaches a second steady vehicle state by use of the images obtained by the perception sensor, wherein at least one of the first steady vehicle state and the second steady vehicle state is a state in which the vehicle combination is in motion;

determining a time period required for driving the vehicle combination from the first steady vehicle state to the second steady vehicle state; and estimating the effective length by use of the time period, a value indicative of the specific angular change, and a value indicative of the specific speed.

2. The method of claim 1, wherein the effective length is further estimated by use of a kinematic vehicle model for the vehicle combination.

3. The method of claim 1, wherein identifying when the vehicle combination reaches the second steady vehicle state comprises determining a point in time when the towing vehicle or the first vehicle segment in the obtained images is stationary relative to the other one of the towing vehicle and the first vehicle segment.

4. The method of claim 1, wherein the images obtained by the perception sensor are used for obtaining articulation angle values of the first articulation joint.

5. The method of claim 4, wherein the obtained articulation angle values are uncalibrated articulation angle values.

6. The method of claim 4, wherein identifying when the vehicle combination reaches the second steady vehicle state comprises determining a point in time when an angle time derivative of the obtained articulation angle values is reduced to a predetermined angle time derivative value.

7. The method of claim 1, wherein the first steady vehicle state is a state where the towing vehicle and the first vehicle segment are provided in a common straight state.

8. The method of claim 1, wherein the first steady vehicle state is a state where a speed of the vehicle combination is zero.

9. The method of claim 1, wherein the vehicle combination further comprises:

at least one additional vehicle segment provided in between the towing vehicle and the first vehicle segment;

wherein the additional vehicle segment is connected to the towing vehicle via an additional articulation joint provided in between the towing vehicle and the additional vehicle segment;

wherein the first articulation joint is provided in between the additional vehicle segment and the first vehicle segment; and wherein estimating the effective vehicle length is further performed by use of a second obtained articulation angle value of the additional articulation joint.

10. A method for calibrating an articulation angle sensor of a vehicle combination, the vehicle combination comprising:

a towing vehicle which is connected to a first vehicle segment via a first articulation joint;

wherein the articulation angle sensor is a perception sensor mounted on one of the towing vehicle and the first vehicle segment and arranged to obtain an image of the other one of the towing vehicle and the first vehicle segment;

the method comprising:

estimating an effective length of the first vehicle segment by the method of claim 1; and calibrating the articulation angle sensor by use of the estimated effective length.

11. A control unit for estimating an effective length of a first vehicle segment of a vehicle combination, the vehicle combination comprising:

a towing vehicle which is connected to the first vehicle segment via a first articulation joint; and a perception sensor mounted on one of the towing vehicle and the first vehicle segment and arranged to obtain an image of the other one of the towing vehicle and the first vehicle segment;

wherein the control unit is configured to perform the steps of the method of claim 1.

12. The control unit of claim 11, wherein the control unit is further configured to:

issue a signal for providing the vehicle combination in the first steady vehicle state; and/or issue a signal for initiating the turning and driving maneuver.

13. A control unit for calibrating an articulation angle sensor for a vehicle combination, wherein the control unit is configured to perform the steps of the method of claim 10.

14. A towing vehicle for a vehicle combination, wherein the towing vehicle comprises the control unit of claim 11.

15. A non-volatile memory chip containing instructions which, when carried out by a processor, perform the steps of claim 1.

* * * * *